Nov. 18, 1924.                                          1,516,310
                        T. R. RYAN
                 VALVE OPERATING MECHANISM
                    Filed Jan. 11, 1924
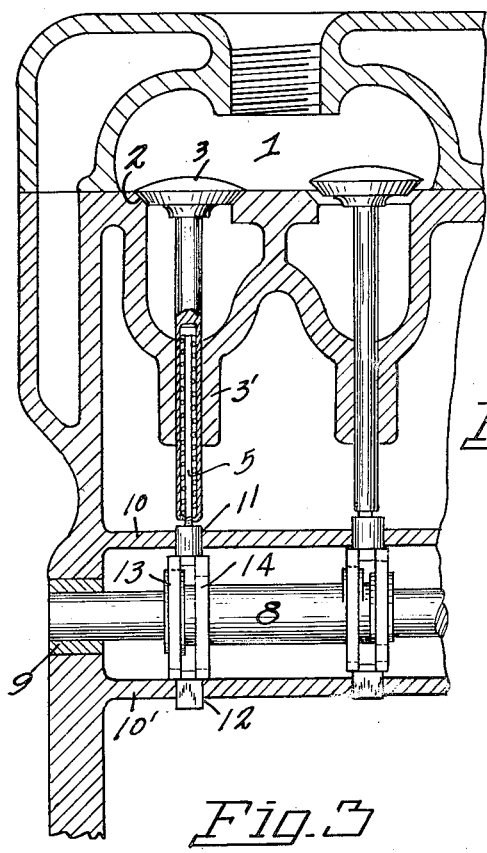
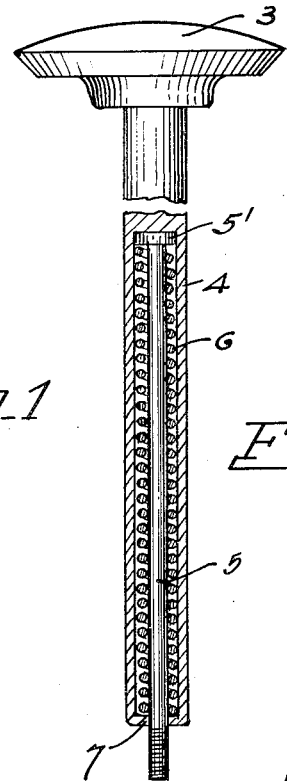
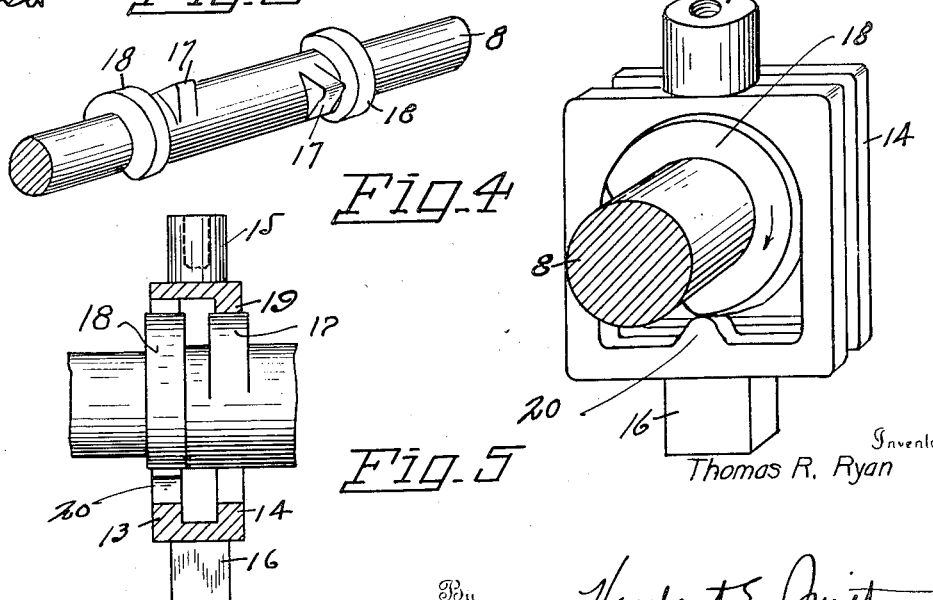
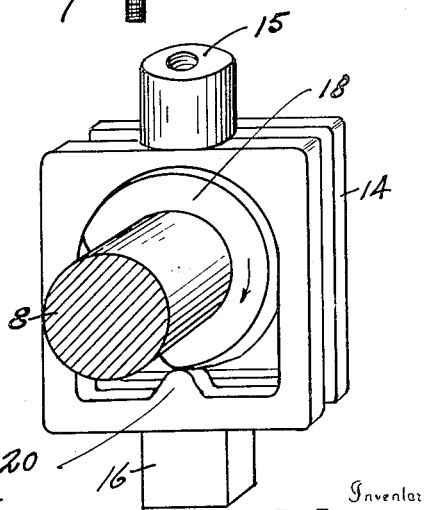
Inventor
Thomas R. Ryan Patented Nov. 18, 1924.

1,516,310

UNITED STATES PATENT OFFICE.

THOMAS R. RYAN, OF HILLYARD, WASHINGTON.

VALVE-OPERATING MECHANISM.

Application filed January 11, 1924. Serial No. 685,697.

*To all whom it may concern:*

Be it known that I, THOMAS R. RYAN, a citizen of the United States, residing at Hillyard, in Spokane County and State of Washington, have invented certain new and useful Improvements in Valve-Operating Mechanisms, of which the following is a specification.

My present invention relates to improvements in valve operating mechanisms applicable for use in connection with tappet valves for internal combustion engines, but capable of use also in connection with other types of valves with other types of engines.

The primary object of the invention is the provision of directly acting means for positively opening and positively closing the valve at predetermined intervals utilizing a rotary cam action in connection with the valve stem. Means are provided to form a resilient connection between the valve and its operating means to compensate for inaccuracy of adjustment that may be due to wear, as well as to compensate for any irregularity in the seating of the valve. Provision is also made for guiding the operating mechanism to reduce friction and insure smooth and accurate working of the parts, thus prolonging the durability of the mechanism and eliminating noise from the operating parts.

The invention consists in certain novel combinations and arrangements of parts as will be hereinafter more fully described and claimed. In the accompanying drawings I have illustrated one complete example of the physical embodiment of my invention wherein a pair of complementary valves having duplex operating mechanisms are shown, the parts being combined and arranged according to the best mode I have thus far devised for the practical application of the principles of my invention.

Figure 1 is a sectional view of a portion of an internal combustion engine, or other type of engine, showing the valve mechanism applied thereto.

Figure 2 is an enlarged detail view partly in section of a tappet valve and its resilient stem.

Figure 3 is a perspective view of a portion of a cam shaft for operating the valves, having complementary cam lugs thereon for a pair of valves.

Figure 4 is an enlarged, detail sectional view showing the relation of one of the valve yokes to the cam shaft when the valve is open.

Figure 5 is a perspective view showing the relation betwen the cam shaft and valve yoke when the valve is closed.

For convenience of illustration I have shown two valves of similar construction with duplex actuating mechanisms, the valves being timed to open and close at different times, but inasmuch as the constructions and operations are similar, a description of one valve and its mechanism will suffice for both valves.

The usual valve chamber 1 is provided in the head of the engine and a valve seat 2 is fashioned for the tappet valve 3 of usual form, and below the seat the customary guide sleeve 3' is used for the valve stem 4. This valve stem it will be observed is a tubular structure within which the push rod 5 is encased and these two members the stem and rod are capable of slight relative movement. Within the tubular stem is located a spring 6 coiled about the rod and interposed between a head 5' of the rod and the flange 7 which surrounds the opening for the rod at the lower end of the stem. The head of the rod is held against the wall at the upper end of the tubular stem by the spring, and the lower end of the rod which projects through the lower end of the tubular stem is threaded as shown.

The valve is actuated through the instrumentality of a cam shaft 8 which is driven in usual or suitable manner from an operating part of the engine and journaled as at 9 in suitable bearings in the engine frame. The frame includes a pair of spaced guide plates 10 and 10' and the shaft is located between these plates, the upper one of which is provided with a circular opening 11 and the lower one is provided with a squared opening 12 in vertical alinement and in alinement with the longitudinal axis of the valve and its stem.

In connection with the cam shaft I utilize a yoke that straddles the shaft and is preferably rectangular in shape with a dividing slot between its two integral, parallel plates 13 and 14. At its upper end the yoke is fashioned with a round boss 15 provided with a socket in which the threaded end of the push rod 5 is secured, and the boss has a bearing in the round opening 11 of the upper guide plate 10. At its lower end the yoke is provided with a depending boss 16, square in cross section and adapted to fit neatly in the squared opening 12 of the lower guide plate 10'. The yoke is permitted to have a vertical movement coincident with the opening and closing movements of the valve and the yoke it will be apparent is guided and maintained in axial alinement with the valve by means of the upper bushing 15 and the lower boss 16.

On the cam shaft at predetermined relative positions are cast or otherwise secured a pair of cams 17 and 18, spaced slightly apart for co-action with the yoke. The cam 17 is in the form of a triangular lug and operates to lift the valve while the cam 18 is in the form of an arcuate flange extending partly around the exterior of the cam shaft.

The open center plate 14 of the yoke is fashioned with an interior lug 19 at its upper end located in the path of movement of the valve-lifting lug or cam 17, and as the cam shaft revolves this cam member 17 in co-action with the cam 19 on the yoke lifts the latter and through the push rod and tubular stem the valve is positively elevated, as at the right in Figure 1, and as shown also in Figure 5. At this time the cam member 18 is inoperative.

The down stroke or closing stroke of the valve is positively effected by means of the arcuate cam 18 in co-action with an upwardly projecting cam lug 20 at the lower end of the plate 13 and located within the open center of the plate, as seen in Figure 5. Here the cam member 18 is in contact with the cam member 20 and the valve is closed and remains closed until the revolving cam member 18 passes from contact with the cam 20, the movement of the cam member 18 being indicated by the arrow in Figure 5.

Thus with the continuously revolving cam shaft, and through the instrumentality of the cams thereon and the cams on the yoke the valve is alternately opened and closed with direct and positive actions.

Should an inaccuracy exist in the adjustment of the valve in its seat, this inaccuracy will be compensated for on the closing stroke of the valve by the resilient connection or spring interposed between the valve stem and push rod. Or should a foreign substance become lodged in the valve seat below its valve this irregularity will be compensated for also by the resilient connection or spring between the tubular stem and push rod.

From the above description taken in connection with my drawings it will be apparent that I have provided a valve operating mechanism which will insure a smooth and accurate working of the parts, which will automatically compensate for inaccuracies or irregularities in connection with the seating of the valve, and which provides a positive action for the valve to insure efficiency and reliability in operation.

Having thus fully described my invention, what I claim as new and desire to secure by Letters Patent is—

The combination with a valve having a tubular stem, of a push rod therein and a spring interposed between said stem and rod, of a cam shaft below the valve having a pair of complementary cams thereon, a yoke loosely straddling the shaft and a guide boss thereon fixed to said rod, an alined guide boss on the lower end of the yoke and a fixed support having guide openings for said bosses, and a pair of cam members on the yoke for co-action with the cams on said shaft.

In testimony whereof I affix my signature.

THOMAS R. RYAN.